US010759053B2

(12) United States Patent
Yamada et al.

(10) Patent No.: US 10,759,053 B2
(45) Date of Patent: Sep. 1, 2020

(54) ROBOT SYSTEM

(71) Applicant: Fanuc Corporation, Yamanashi (JP)

(72) Inventors: Makoto Yamada, Yamanashi (JP);
Kenshirou Oono, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 3 days.

(21) Appl. No.: 16/204,084

(22) Filed: Nov. 29, 2018

(65) Prior Publication Data
US 2019/0184562 A1 Jun. 20, 2019

(30) Foreign Application Priority Data

Dec. 14, 2017 (JP) .................................. 2017-239145

(51) Int. Cl.
B25J 9/16 (2006.01)
B25J 19/02 (2006.01)
(52) U.S. Cl.
CPC ........... *B25J 9/1669* (2013.01); *B25J 9/1674* (2013.01); *B25J 9/1697* (2013.01); *B25J 19/023* (2013.01)
(58) Field of Classification Search
CPC .................................. B25J 9/16; B25J 19/02
See application file for complete search history.

(56) References Cited

U.S. PATENT DOCUMENTS

| 2004/0150726 A1* | 8/2004 | Gallagher ................. G06T 5/00 348/222.1 |
| 2005/0065647 A1 | 3/2005 | Perry et al. |
| 2005/0096792 A1* | 5/2005 | Watanabe .............. B25J 19/023 700/245 |
| 2006/0072809 A1* | 4/2006 | Hashimoto ............ B25J 9/1697 382/153 |
| 2007/0195995 A1 | 8/2007 | Matsumoto et al. |
| 2010/0303337 A1 | 12/2010 | Wallack et al. |

(Continued)

FOREIGN PATENT DOCUMENTS

| CN | 1757492 A | 4/2006 |
| CN | 106999024 A | 8/2017 |

(Continued)

OTHER PUBLICATIONS

Matsui, Hironori; Decision to Grant a Patent; Japanese Patent Application No. 2017-239145; dated Dec. 10, 2019; 3 pages.

(Continued)

*Primary Examiner* — Kira Nguyen
(74) *Attorney, Agent, or Firm* — Shackelford, Bowen, McKinley & Norton, LLP

(57) ABSTRACT

A robot system is provided with: a plurality of robots; an image acquisition unit that can be attached and detached with respect to each of the robots and that acquires an image of an inspection target object; and a plurality of image inspection units that are respectively connected to the robots and that each inspect the inspection target object on the basis of the image acquired by the image acquisition unit. The image acquisition unit holds image-inspection data that includes optical property data indicating optical properties of the image acquisition unit and that is used in the inspection performed by the image inspection units, and transmits the image-inspection data to the image inspection unit that is connected to the robot to which the image acquisition unit is attached.

4 Claims, 2 Drawing Sheets

(56) References Cited

U.S. PATENT DOCUMENTS

| | | | |
|---|---|---|---|
| 2011/0029131 A1 | 2/2011 | Ban et al. | |
| 2012/0265344 A1* | 10/2012 | Nakahara | B25J 9/1697 700/259 |
| 2014/0046486 A1 | 2/2014 | Mimura et al. | |
| 2014/0156072 A1 | 6/2014 | Ban et al. | |
| 2017/0251911 A1 | 9/2017 | Ito | |
| 2019/0073760 A1* | 3/2019 | Wang | G06T 7/0004 |

FOREIGN PATENT DOCUMENTS

| | | |
|---|---|---|
| DE | 102006004153 A1 | 8/2007 |
| DE | 112010002174 T5 | 10/2012 |
| DE | 102010032840 B4 | 6/2015 |
| EP | 1527852 A1 | 5/2005 |
| EP | 1645373 A2 | 4/2006 |
| EP | 1413850 B1 | 8/2011 |
| EP | 2511055 A1 | 10/2012 |
| EP | 3345530 A1 | 7/2018 |
| JP | H06-039763 A | 2/1994 |
| JP | H06-315881 A | 11/1994 |
| JP | 2004-017260 A | 1/2004 |
| JP | 2005-131761 A | 5/2005 |
| JP | 2006-105782 A | 4/2006 |
| JP | 4137862 B2 | 8/2008 |
| JP | 2010-076056 A | 4/2010 |
| JP | 4466585 B2 | 5/2010 |
| JP | 2012-223839 A | 11/2012 |
| WO | 2010138565 A2 | 12/2010 |

OTHER PUBLICATIONS

The State Intellectual Propety Office of the People's Republic of China; First Office Action; Chinese Application No. 201811509706.5; dated Apr. 23, 2020; 8 pages.

Liebschner, Mario; Office Action for German Patent Application No. 102018130942.2; dated Jun. 23, 2020; 6 pages.

* cited by examiner

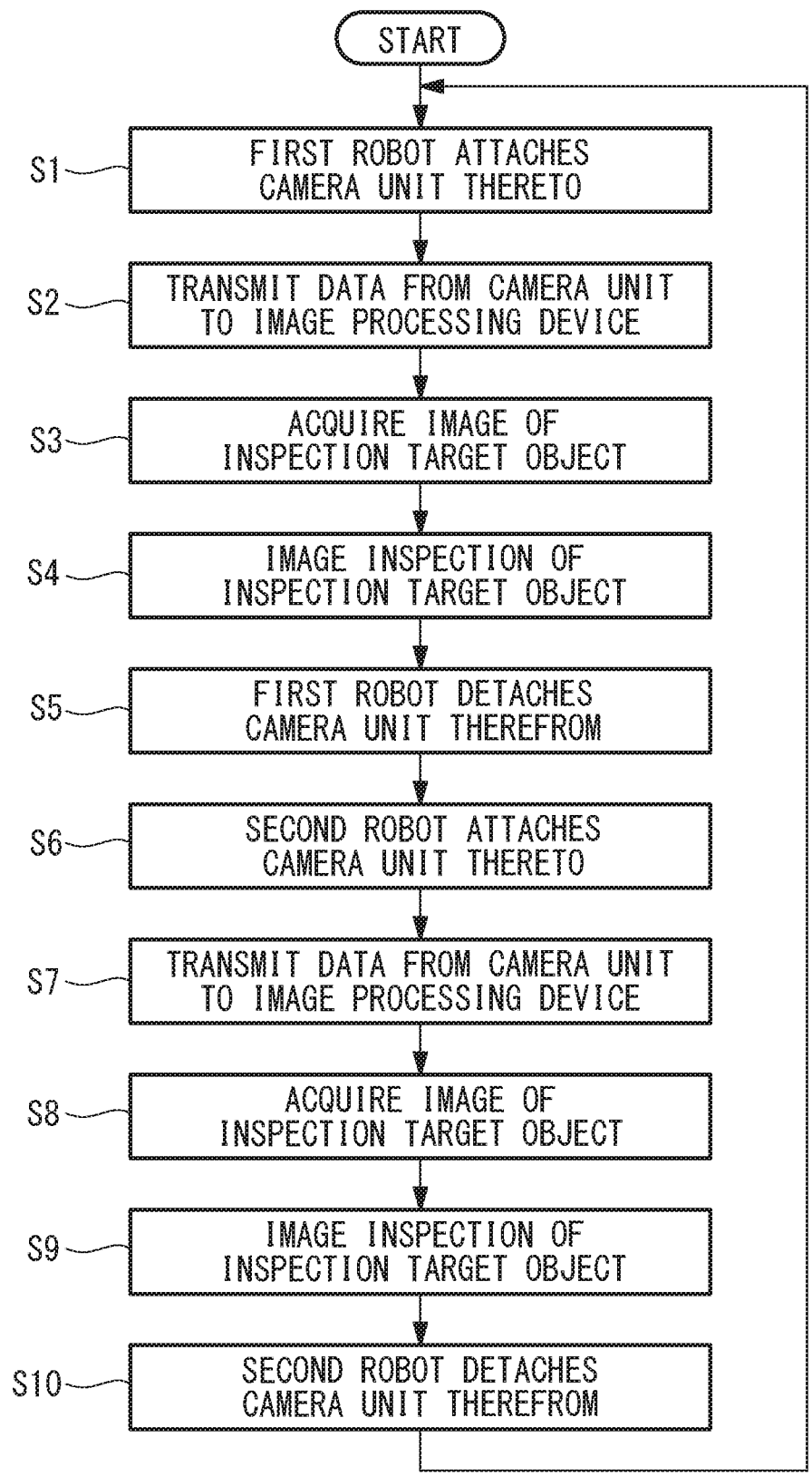

ROBOT SYSTEM

CROSS-REFERENCE TO RELATED APPLICATIONS

This application is based on Japanese Patent Application No. 2017-239145, the contents of which are incorporated herein by reference.

TECHNICAL FIELD

The present invention relates to a robot system and particularly to a robot system that performs inspection of an inspection target object on the basis of an image.

BACKGROUND ART

In the related art, there is a known system in which an image of an inspection target object is acquired by a camera attached to a robot, and length measurement, appearance checks, etc. of the inspection target object are performed on the basis of the image (for example, see Japanese Unexamined Patent Application, Publication No. 2010-076056, and Japanese Unexamined Patent Application, Publication No. 2005-131761).

On the other hand, there is a known system in which a single camera is attached to a plurality of robots in turn, and measurement of relative positions and orientations of a plurality of pairs of the robots and measurement target objects is performed by using the single camera (for example, see Publication of Japanese Patent No. 4137862).

SUMMARY OF INVENTION

According to one aspect, the present invention provides a robot system including: a plurality of robots; an image acquisition unit that can be attached and detached with respect to each of the plurality of robots and that acquires an image of an inspection target object; and a plurality of image inspection units that are respectively connected to the plurality of robots and that each inspect the inspection target object on the basis of the image acquired by the image acquisition unit, wherein the image acquisition unit holds image-inspection data that includes optical property data indicating optical properties of the image acquisition unit and that is used in the inspection performed by the image inspection units, and transmits the image-inspection data to the image inspection unit that is connected to the robot to which the image acquisition unit is attached.

The above-described aspect may further include a tool changer that attaches the image acquisition unit to one of the robots.

In the above-described aspect, transmission cables for transmitting the image-inspection data may be respectively connected to the image acquisition unit and the image inspection units; and the tool changer may have a connection part that connects the transmission cable that is connected to the image acquisition unit and one of the transmission cables The above-described aspect may further include a production management device that controls the plurality of robots so as to cause the plurality of robots to perform an attachment operation and a detachment operation of the image acquisition unit, in turn.

BRIEF DESCRIPTION OF DRAWINGS

FIG. 2 is a flowchart showing an image inspection operation performed by the robot system shown in FIG. 1.

DESCRIPTION OF EMBODIMENTS

Figure 1:
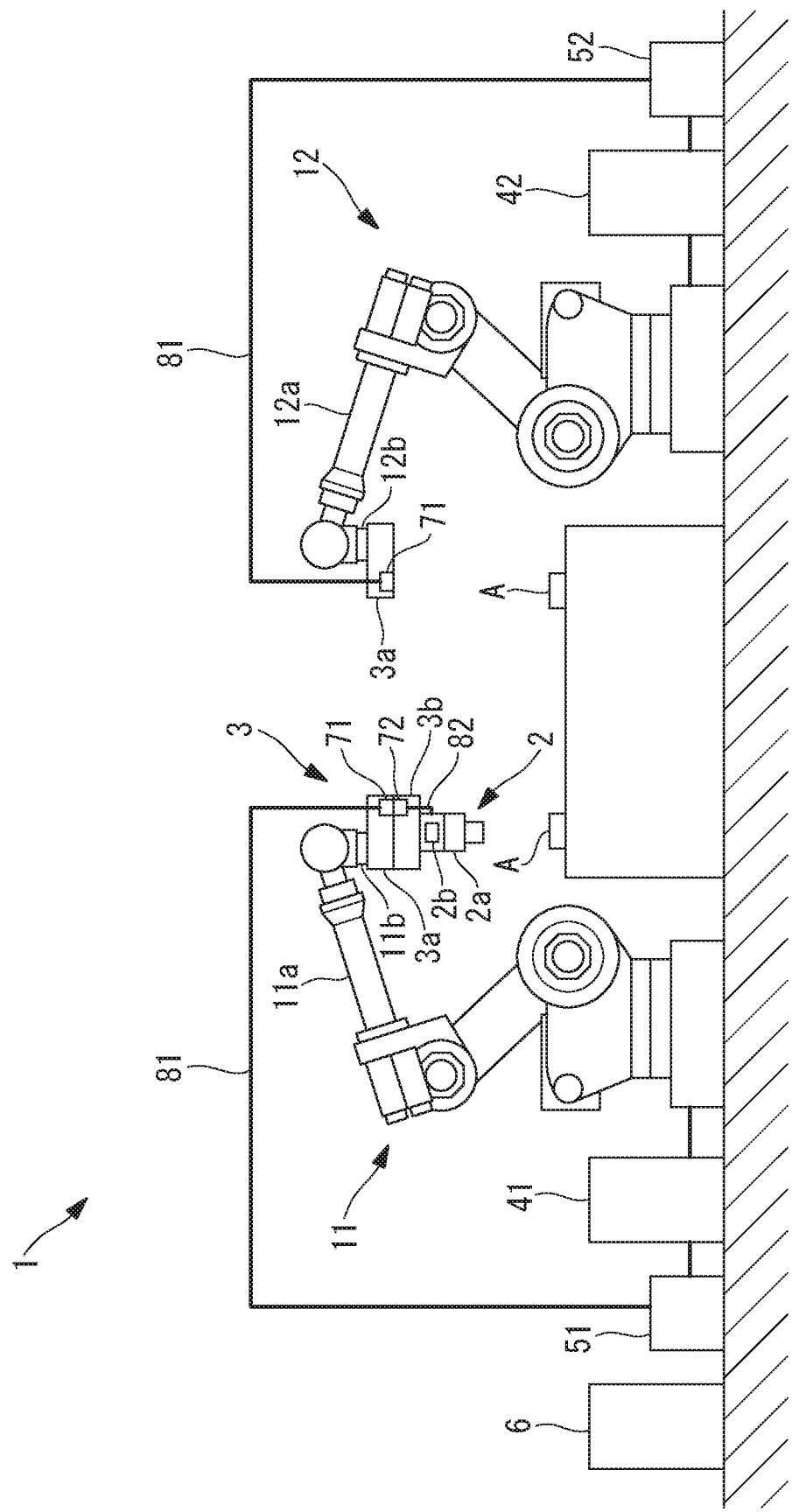
FIG. 1 is a view showing the overall configuration of a robot system according to one embodiment of the present invention.

A robot system 1 according to one embodiment of the present invention will be described below with reference to the drawings.

In the robot system 1 of this embodiment, the position and the orientation of a camera unit 2 with respect to an inspection target object A are controlled by robots 11, 12, and inspections, such as length measurement and appearance check, of the inspection target object A are performed on the basis of an image of the inspection target object A acquired by the camera unit 2.

As shown in FIG. 1, the robot system 1 is provided with: a plurality of robots 11, 12; the single camera unit (image acquisition unit) 2, which is shared by the plurality of robots 11, 12; a tool changer 3 that attaches the camera unit 2 to each of the robots 11, 12; a plurality of robot control devices 41, 42 that are respectively connected to the robots 11, 12; a plurality of image processing devices (image inspection units) 51, 52 that are respectively connected to the robot control devices 41, 42; and a production management device 6 that manages and controls the whole robot system 1.

Although FIG. 1 shows the robot system 1, in which one camera unit 2 is shared by the two robots 11, 12, the robot system 1 may be configured such that one camera unit 2 is shared by three or more robots.

The robots 11, 12 are industrial robots of an arbitrary type that are generally used for image inspection. FIG. 1 shows 6-axis articulated robots 11, 12, as an example. The robots 11, 12 respectively have: arms 11a, 12a; and attachment flanges 11b, 12b that are provided at distal ends of the arms 11a, 12a and to each of which the camera unit 2 is attached via the tool changer 3.

The camera unit 2 is provided with: a camera 2a that acquires an image of the inspection target object A; and a storage device 2b.

The storage device 2b stores, in advance, image-inspection data used in image processing performed by the image processing devices 51, 52. The image-inspection data includes optical property data indicating the optical properties of the camera 2a, such as a focal length and lens distortion. The image-inspection data may further include another type of data required in the image processing performed by the image processing devices 51, 52, for example, a template image for the inspection target object A that is used to recognize the inspection target object A in an image, and position information of an inspection site of the inspection target object A.

The storage device 2b stores, in advance, an operating program for controlling the operations of the robots 11, 12 and the camera unit 2 during image inspection. The storage device 2b stores images acquired by the camera 2a.

In case that the image-inspection data and the operating program, which are stored in the storage device 2b, are corrupted, backup data of the image-inspection data and the operating program may be saved in another storage device (for example, a storage device of the production management device 6) that is provided in the robot system 1.

The tool changer 3 is provided with: robot-side adapters 3a that are attached to the respective attachment flanges 11b, 12b; and a tool-side adapter 3b that is attached to the camera unit 2. The robot 11, 12 sends air pressure or an electrical signal to the corresponding robot-side adapter 3a, thereby connecting/disconnecting the robot-side adapter 3a to/from the tool-side adapter 3b, and thereby performing attachment/detachment of the camera unit 2 with respect to the attachment flange 11b, 12b.

It is also possible to prepare, in addition to the camera unit 2, another tool (for example, a handling hand for the inspection target object A or a processing tool for the inspection target object A) to which another tool-side adapter 3b is attached, and the robots 11, 12 may perform a plurality of types of tasks in turn while switching between the camera unit 2 and the other tool.

The adapters 3a, 3b are respectively provided with connection parts 71, 72 that are connected to each other when the adapters 3a, 3b are connected. The image processing device 51 is connected to the connection part 71 of the robot-side adapter 3a of the robot 11 by a transmission cable 81. The image processing device 52 is connected to the connection part 71 of the robot-side adapter 3a of the robot 12 by a transmission cable 81. The camera unit 2 is connected to the connection part 72 of the tool-side adapter 3b by a transmission cable 82.

Therefore, the camera unit 2 is automatically connected to the image processing device 51 by the transmission cables 81, 82 when the camera unit 2 is connected to the attachment flange 11b via the tool changer 3, and the camera unit 2 is automatically connected to the image processing device 52 by the transmission cables 81, 82 when the camera unit 2 is connected to the attachment flange 12b via the tool changer 3.

When the camera unit 2 is connected to the image processing device 51 or 52, power is supplied from the image processing device 51 or 52 to the camera unit 2 via the transmission cables 81, 82, and the image-inspection data and the operating program are transmitted from the camera unit 2, which is now activated through the power supply, to the image processing device 51 or 52 via the transmission cables 81, 82. Thereafter, an image acquired by the camera 2a is transmitted from the camera unit 2 to the image processing device 51 or 52 via the transmission cables 81, 82.

In a case in which the camera unit 2 acquires many images in a short period of time while the robot 11, 12 is operated at high speed, it is necessary to transmit the many images from the camera unit 2 to the image processing device 51, 52 in a short period of time. Therefore, it is preferable to use transmission cables 81, 82 that can perform high-speed transmission.

The robot control devices 41, 42 are each provided with a storage device (not shown) and a processor (not shown), such as a central processing unit. The storage device stores various programs for controlling the operation of the robot 11, 12. The processor operates according to the programs, thereby realizing control of the robot 11, 12 performed by the robot control device 41, 42.

The robot control device 41, 42 causes the robot 11, 12 to perform an attachment operation of the camera unit 2 to the attachment flange 11b, 12b and a detachment operation of the camera unit 2 from the attachment flange 11b, 12b. For example, in the attachment operation, the robot 11, 12 operates the arm 11a, 12a to move the attachment flange 11b, 12b to a predetermined position at which the camera unit 2 is disposed, and attaches the camera unit 2 to the attachment flange 11b, 12b. In the detachment operation, the robot 11, 12 operates the arm 11a, 12a to move the attachment flange 11b, 12b to a predetermined position, detaches the camera unit 2 from the attachment flange 11b, 12b, and disposes the camera unit 2 at the predetermined position.

After the camera unit 2 is attached to the attachment flange 11b, 12b, the robot control device 41, 42 receives the operating program, which is transmitted from the camera unit 2 to the image processing device 51, 52, from the image processing device 51, 52, and stores the operating program in the storage device. Next, the robot control device 41, 42 controls the robot 11, 12 and the camera unit 2, which is connected to the robot 11, 12 via the tool changer 3, according to the operating program. Specifically, the robot control device 41, 42 moves the arm 11a, 12a of the robot 11, 12, thereby disposing the camera unit 2 at a predetermined position and in a predetermined orientation with respect to the inspection target object A, and causes the camera 2a to acquire an image of the inspection target object A.

Image capturing conditions, such as the relative positions of the robot 11, 12 and the camera unit 2, the image capturing distance from the camera unit 2 to the inspection target object A, and the tilt of a stage on which the inspection target object A is placed, could differ between the robots 11, 12. If such differences in the image capturing conditions exist between the robots 11, 12, calibration data for correcting an image of the inspection target object A acquired by the camera 2a, according to the image capturing conditions, may be stored in advance in the storage devices of the robot control devices 41, 42. This calibration data is transmitted from the robot control device 41, 42 to the image processing device 51, 52 and is used by the image processing device 51, 52.

The image processing device 51, 52 supplies power to the camera unit 2, which is connected thereto by the transmission cables 81, 82.

The image processing devices 51, 52 are each provided with a storage device (not shown) and a processor (not shown), such as a central processing unit. The storage device stores an image processing program for image inspection. When the image processing device 51, 52 receives an image of the inspection target object A from the camera unit 2, the processor applies image processing using the image-inspection data to the image according to the image processing program, thereby realizing image inspection processing for the inspection target object A performed by the image processing device 51, 52.

In an image acquired by the camera 2a, aberrations, which are caused by lens distortion etc. in the camera 2a, occur. In the image inspection processing for the inspection target object A, first, the image processing device 51, 52 corrects the aberrations in the image on the basis of the optical property data of the camera 2a. The image-inspection data transmitted from the camera unit 2 to the image processing device 51, 52 includes calibration data for correcting aberrations, and the image processing device 51, 52 may perform aberration correction by using the calibration data.

After the aberration correction, the image processing device 51, 52 may further correct the image on the basis of calibration data from the robot control device 41, 42.

Next, the image processing device 51, 52 performs an inspection of the inspection target object A on the basis of the image that has been subjected to the aberration correction. For example, the image processing device 51, 52 recognizes the inspection target object A in the image through template matching using the template image, detects an inspection site of the inspection target object A, through edge extraction etc., on the basis of the position information of the inspection site, and measures the length of the detected inspection site.

Although FIG. 1 shows the image processing devices 51, 52 separately from the robot control devices 41, 42, the image processing devices 51, 52 may be realized as parts of the functions of the robot control devices 41, 42.

The production management device 6 is connected to the robot control devices 41, 42 by wires (not shown). The production management device 6 controls the robot control devices 41, 42 so as to cause the two robots 11, 12 to perform the attachment operation and the detachment operation of the camera unit 2, in turn.

Next, the operation of the robot system 1 during the image inspection of the inspection target object A will now be described with reference to FIG. 2.

When the first robot 11 attaches the camera unit 2 to the attachment flange 11b via the tool changer 3 (Step S1), power supply from the image processing device 51 to the camera unit 2 is started, and the image-inspection data is transmitted from the camera unit 2 to the image processing device 51 via the tool changer 3 (Step S2). In Step S2, the operating program for the robot 11 and the camera unit 2 is transmitted from the camera unit 2 to the robot control device 41 via the image processing device 51, and the operating program is set in the robot control device 41.

Next, according to the operating program, the robot control device 41 causes the first robot 11 and the camera unit 2 to perform acquisition of an image of the inspection target object A (Step S3). Specifically, the arm 11a is operated to dispose the camera unit 2 at the predetermined position and in the predetermined orientation, and the camera 2a acquires an image of the inspection target object A. The acquired image is transmitted from the camera unit 2 to the image processing device 51.

Next, in the image processing device 51, aberration correction processing is applied to the image of the inspection target object A on the basis of the optical property data of the camera 2a, and then, image inspection processing, such as length measurement or appearance check, of the inspection target object A is performed (Step S4).

Next, the power supply from the image processing device 51 to the camera unit 2 is stopped, and the first robot 11 detaches the camera unit 2 from the attachment flange 11b(Step S5). After Step S5, the robot 11 performs a task, such as transportation of the inspection target object A, for example.

Next, when the second robot 12 attaches the camera unit 2 to the attachment flange 12b via the tool changer 3 (Step S6), power supply from the image processing device 52 to the camera unit 2 is started, and the image-inspection data is transmitted from the camera unit 2 to the image processing device 52 via the tool changer 3 (Step S7). In Step S7, as in Step S2, the operating program for the robot 12 and the camera unit 2 is transmitted from the camera unit 2 to the robot control device 42, and the operating program is set in the robot control device 42.

Next, as in Step S3, according to the operating program, the robot control device 42 causes the second robot 12 and the camera unit 2 to perform acquisition of an image of the inspection target object A (Step S8).

Next, as in Step S4, in the image processing device 52, aberration correction processing is applied to the image of the inspection target object A on the basis of the optical property data of the camera 2a, and then, image inspection processing, such as length measurement or appearance check, of the inspection target object A is performed (Step S9).

Next, the power supply from the image processing device 52 to the camera unit 2 is stopped, and the second robot 12 detaches the camera unit 2 from the attachment flange 12b (Step S10). After Step S10, the robot 12 performs a task, such as transportation of the inspection target object A, for example.

Thereafter, Steps S1 to S10 are repeated.

In a case in which many images are acquired in Step S3, it may take time (for example, from several seconds to several tens of seconds) for the image processing performed by the image processing device 51 in Step S4. In such a case, detachment of the camera unit 2 in Step S5 may be performed immediately after Step S3, and the image processing performed by the image processing device 51 in Step S4 may be performed while the second robot 12 performs the image acquisition task in Step S8. In this way, the image processing performed by the image processing device 51 and the image acquisition task performed by the second robot 12 are performed in parallel, thereby making it possible to reduce the cycle time.

In the same way, detachment of the camera unit 2 in Step S10 may be performed immediately after Step S8, and the next image acquisition task performed by the first robot 11 in Step S4 and the image processing performed by the image processing device 52 in Step S9 may be performed in parallel.

As described above, the camera 2a has unique optical properties, such as lens distortion. Therefore, in a case in which two camera units are prepared for the robot 11 and the robot 12, there is a difference in quality between images of inspection target objects A acquired by the two camera units, and there could be a difference between the image inspection results obtained by the two image processing devices 51, 52, the difference being caused by the difference in quality between the images. Therefore, for example, in a strict inspection of the inspection target object A, the image quality is required to be fixed.

According to this embodiment, the one camera unit 2, which has the optical property data of the camera 2a, is shared by the plurality of robots 11, 12. Then, the optical property data is transmitted from the camera unit 2 to the image processing device 51, 52 of the robot 11, 12 to which the camera unit 2 is attached. Therefore, the plurality of image processing devices 51, 52 can use, for image inspection processing, images that are acquired by the same camera 2a and that are corrected on the basis of the same optical property data. Specifically, there is an advantage in that the plurality of image processing devices 51, 52 can perform image inspection by using images having a fixed quality, thus making it possible to stabilize the accuracy of image inspection.

Because only one piece of image-inspection data is created and is managed with respect to a plurality of pairs of the robots 11, 12 and the image processing devices 51, 52, there is an advantage in that it is possible to reduce the number of tasks required to create and manage the image-inspection data.

Because the one camera unit 2 suffices for the plurality of robots 11, 12, there is an advantage in that the product cost of the robot system 1 can be reduced.

When the one camera unit 2 is shared by the plurality of robots 11, 12, the problem is wiring of cables for connecting the camera unit 2 and the image processing devices 51, 52. Specifically, if the camera unit 2 is shared by the plurality of robots 11, 12 in a state in which camera unit 2 is connected to the plurality of image processing devices 51, 52 by the cables, the operating ranges of the robots 11, 12 could be limited by the cables, and the cables could interfere with the operating robots 11, 12. According to this embodiment, the tool changer 3, which has the connection parts 71, 72, is used to attach the camera unit 2 to the robot 11, 12, thereby making it possible to solve the above-described cable problem.

In this embodiment, although the image-inspection data is transmitted from the camera unit 2 to the image processing device 51, 52 by the transmission cables 81, 82, instead of this, it is also possible to transmit the image-inspection data wirelessly.

In this embodiment, although the camera unit 2 is attached to the robot 11, 12 via the tool changer 3, instead of this, it is also possible to directly attach the camera unit 2 to the attachment flange 11b, 12b.

In this embodiment, although attachment and detachment of the camera unit 2 with respect to the robot 11, 12 are performed by the robot 11, 12 itself, instead of this, the attachment and detachment thereof may be performed by an operator.

In this embodiment, although a description has been given of an example case in which the two robots 11, 12, which are disposed adjacent to each other, each move to get the camera unit 2, the production management device 6 may control a transport device or a transport robot (not shown) so as to transport the camera unit 2 from the robot to which the camera unit 2 is currently attached to the robot to which the camera unit 2 is to be attached next.

As a result, the following aspect is derived from the above described embodiment.

According to one aspect, the present invention provides a robot system including: a plurality of robots; an image acquisition unit that can be attached and detached with respect to each of the plurality of robots and that acquires an image of an inspection target object; and a plurality of image inspection units that are respectively connected to the plurality of robots and that each inspect the inspection target object on the basis of the image acquired by the image acquisition unit, wherein the image acquisition unit holds image-inspection data that includes optical property data indicating optical properties of the image acquisition unit and that is used in the inspection performed by the image inspection units, and transmits the image-inspection data to the image inspection unit that is connected to the robot to which the image acquisition unit is attached.

According to this aspect, the position and the orientation of the image acquisition unit, which is attached to the robot, are determined with respect to the inspection target object through the operation of the robot, and an image of the inspection target object is acquired by the image acquisition unit. The quality of the acquired image is affected by the optical properties of the image acquisition unit. For example, aberration caused by lens distortion of the image acquisition unit occurs in an image. The image acquisition unit holds the image-inspection data, which includes optical property data of the image acquisition unit, and transmits the image-inspection data from the image acquisition unit to the image inspection unit of the robot to which the image acquisition unit is connected. Therefore, the image inspection unit subjects the image to processing, such as aberration correction, on the basis of the optical property data, thus making it possible to acquire an image from which the influence of the optical properties of the image acquisition unit is removed and to use the acquired image for image inspection.

In this case, the image acquisition unit can be attached and detached with respect to each of the plurality of robots, and the plurality of robots perform an image acquisition task by using the same image acquisition unit in turn. Therefore, the plurality of image inspection units, which are respectively connected to the plurality of robots, can use, for inspection, images that are acquired by the same image acquisition unit and that are subjected to processing, such as aberration correction, on the basis of the same optical property data. Accordingly, it is possible to use images having a fixed quality for inspections performed by all the image inspection units, thus making it possible to stabilize the accuracy of inspections.

The above-described aspect may further include a tool changer that attaches the image acquisition unit to one of the robots.

By using the tool changer, the robots can be made to perform the attachment operation and the detachment operation of the image acquisition unit with respect to the robots. A tool to be connected to the robot can be easily switched between the image acquisition unit and another tool.

In the above-described aspect, transmission cables for transmitting the image-inspection data may be respectively connected to the image acquisition unit and the image inspection units; and the tool changer may have a connection part that connects the transmission cable that is connected to the image acquisition unit and one of the transmission cables that are connected to the image inspection units.

When the image acquisition unit is attached to the robot via the tool changer, the transmission cable that is connected to the image acquisition unit and the transmission cable that is connected to the image inspection unit are connected to each other by the connection part. When the image acquisition unit is detached from the robot, the transmission cable that is connected to the image acquisition unit and the transmission cable that is connected to the image inspection unit are disconnected from each other by the connection part. Accordingly, it is possible to eliminate connection and disconnection tasks for the transmission cables when the image acquisition unit is attached and detached with respect to the robot.

The above-described aspect may further include a production management device that controls the plurality of robots so as to cause the plurality of robots to perform an attachment operation and a detachment operation of the image acquisition unit, in turn.

By doing so, it is possible to cause the robots to perform attachment/detachment of the image acquisition unit with respect to the robots and handing over of the image acquisition unit between the robots.

REFERENCE SIGNS LIST 1 robot system
11, 12 robot
11a, 12a arm
11b, 12b attachment flange
2 camera unit (image acquisition unit)
2a camera
2b storage device
3 tool changer
3a robot-side adapter
3b tool-side adapter
41, 42 robot control device
51, 52 image processing device (image inspection unit)
6 production management device
71, 72 connection part
81, 82 transmission cable
A inspection target object

The invention claimed is:

1. A robot system comprising:
   a plurality of robots;
   an image acquisition unit that can be attached and detached with respect to each of the plurality of robots and that acquires images of an inspection target object;
   a plurality of image inspection units that are respectively connected to the plurality of robots and that each inspect the inspection target object on the basis of an image acquired by the image acquisition unit;
   wherein the image acquisition unit holds image-inspection data that includes a template image for the inspection target object, position information of an inspection site of the inspection target object, and optical property data indicating optical properties of the image acquisition unit and that is used in inspections performed by the plurality of image inspection units, and transmits the image-inspection data to an image inspection unit of the plurality of image inspection units that is connected to a robot of the plurality of robots to which the image acquisition unit is attached; and
   wherein the plurality of image inspection units recognize the inspection target object in the image by using the template image, detect the inspection site of the inspection target object on the basis of the position information of the inspection site, and measure a length of the detected inspection site.

2. The robot system according to claim 1, further comprising a tool changer that attaches the image acquisition unit to any one of the plurality of robots.

3. The robot system according to claim 2,
   wherein transmission cables for transmitting the image-inspection data are respectively connected to the image acquisition unit and the plurality of image inspection units; and
   the tool changer has a connection part that connects the transmission cable that is connected to the image acquisition unit and one of the transmission cables connected to the image inspection units.

4. The robot system according to claim 1, further comprising a production management device that controls the plurality of robots so as to cause the plurality of robots to perform an attachment operation and a detachment operation of the image acquisition unit, in turn.

* * * * *